Feb. 5, 1963  V. K. PELTOLA  3,076,338
PULSED RESISTANCE THERMOMETERS
Filed July 22, 1959  5 Sheets-Sheet 4

INVENTOR.
Veikko K. Peltola,
BY Robert H. Wendt
Attorney.

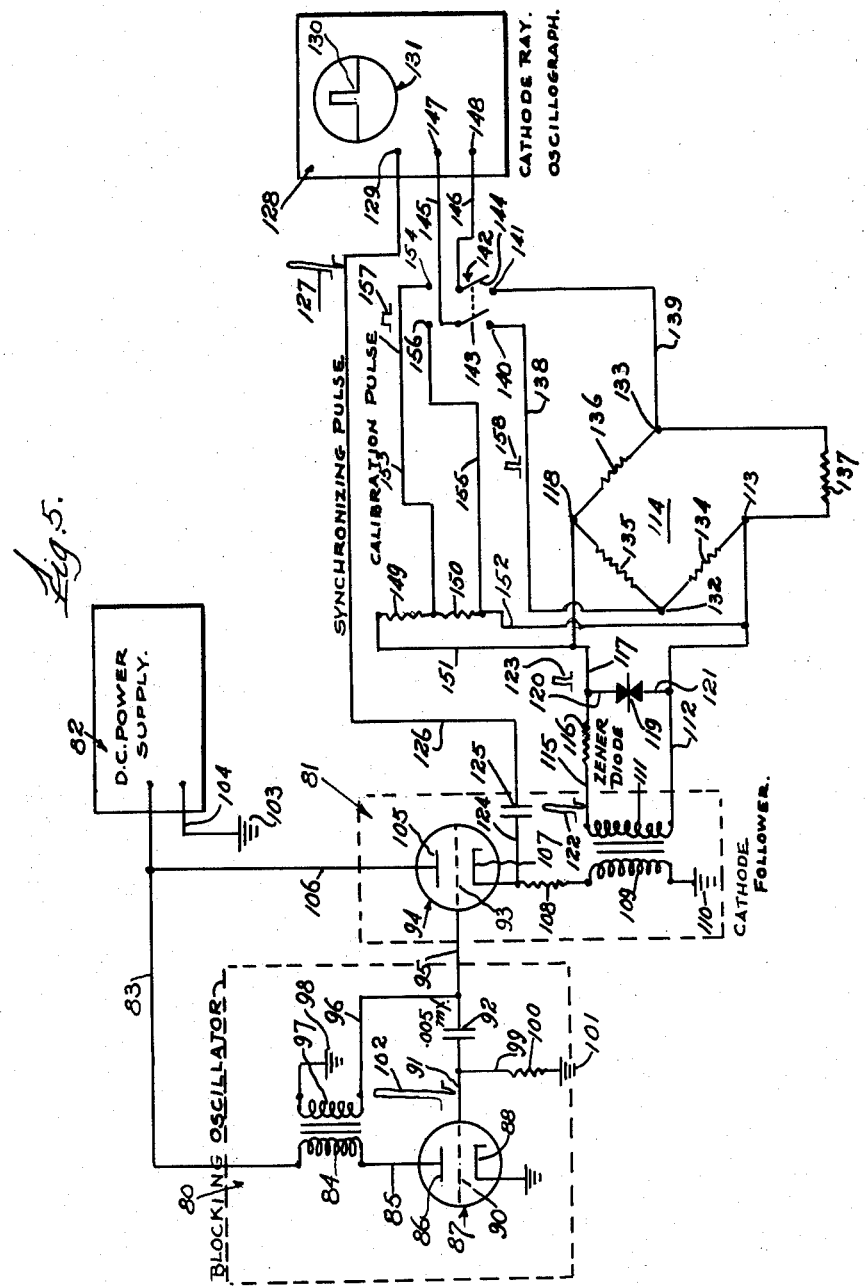

United States Patent Office 3,076,338
Patented Feb. 5, 1963

3,076,338
PULSED RESISTANCE THERMOMETERS
Veikko K. Peltola, Chicago, Ill., assignor to Illinois Testing Laboratories, Inc., Chicago, Ill., a corporation of Illinois
Filed July 22, 1959, Ser. No. 828,913
2 Claims. (Cl. 73—362)

The present invention relates to pulsed resistance thermometers, and is particularly concerned with resistance thermometers having a high output voltage.

It is usually a very desirable characteristic to attain a high output voltage if it can be secured from a resistance thermometer bridge circuit. The output voltage may be increased by applying a higher voltage to the bridge circuit; but the amount of voltage that can be applied to the bridge circuit is limited by the amount of self-heating that can be tolerated in the temperature sensitive resistance element.

Increase in the self-heating of the sensitive resistance element has a bad effect on the accuracy of the readings secured from the thermometer.

One of the objects of the invention is the provision of an improved resistance thermometer circuit which permits the application of a high voltage to the bridge circuit without excessive heating of the resistance bulb by applying the high voltage in short pulses.

Another object of the invention is the provision of such a circuit in which the duration and amplitude of the pulses of high voltage are adapted to produce substantially the same wattage dissipation in the thermobulb as would be obtained by the use of a normal D.C. or A.C. bridge current.

Another object of the invention is the provision of an improved circuit and energizing system for resistance thermometers which permits the use of A.C. amplifiers and of a cathode ray oscillograph.

Another object of the invention is the provision of a resistance thermometer system having a high degree of accuracy, in which a Zener diode limiter may be used in conjunction with a blocking oscillator type power supply to obtain a pulse of constant amplitude for the bridge circuit, and in which a portion of the constant amplitude pulse may be used as a calibration pulse for the oscilloscope.

Another object of the invention is the provision of an improved resistance thermometer system in which the bridge circuit output could be fed into several circuits, one of which may be a cathode ray oscilloscope calibrated to indicate temperature, another may be an alarm circuit that would operate when the applied pulse had achieved a particular amplitude, another may be an on-and-off circuit, and another a proportioning control circuit.

Other objects and advantages of the invention will be apparent from the following description and the accompanying drawings, in which similar characters of reference indicate similar parts throughout the several views.

Referring to the five sheets of drawings accompanying this specification,

FIG. 5 is an exemplary wiring diagram of the simplest form of pulsed resistance thermometer for indicating the temperature of one temperature zone.

I desire it to be understood that the details of the circuits in a sawtooth sweep generator, a blocking oscillator, an electronic switch, or an oscillograph amplifier or any of the other elements which are diagrammatically indicated in the simplified circuit are old per se and that, therefore, any standard circuits may be employed in these generally indicated components of the diagrams, which have been simplified for better understanding of the new combinations involved in my invention.

Figure 1:
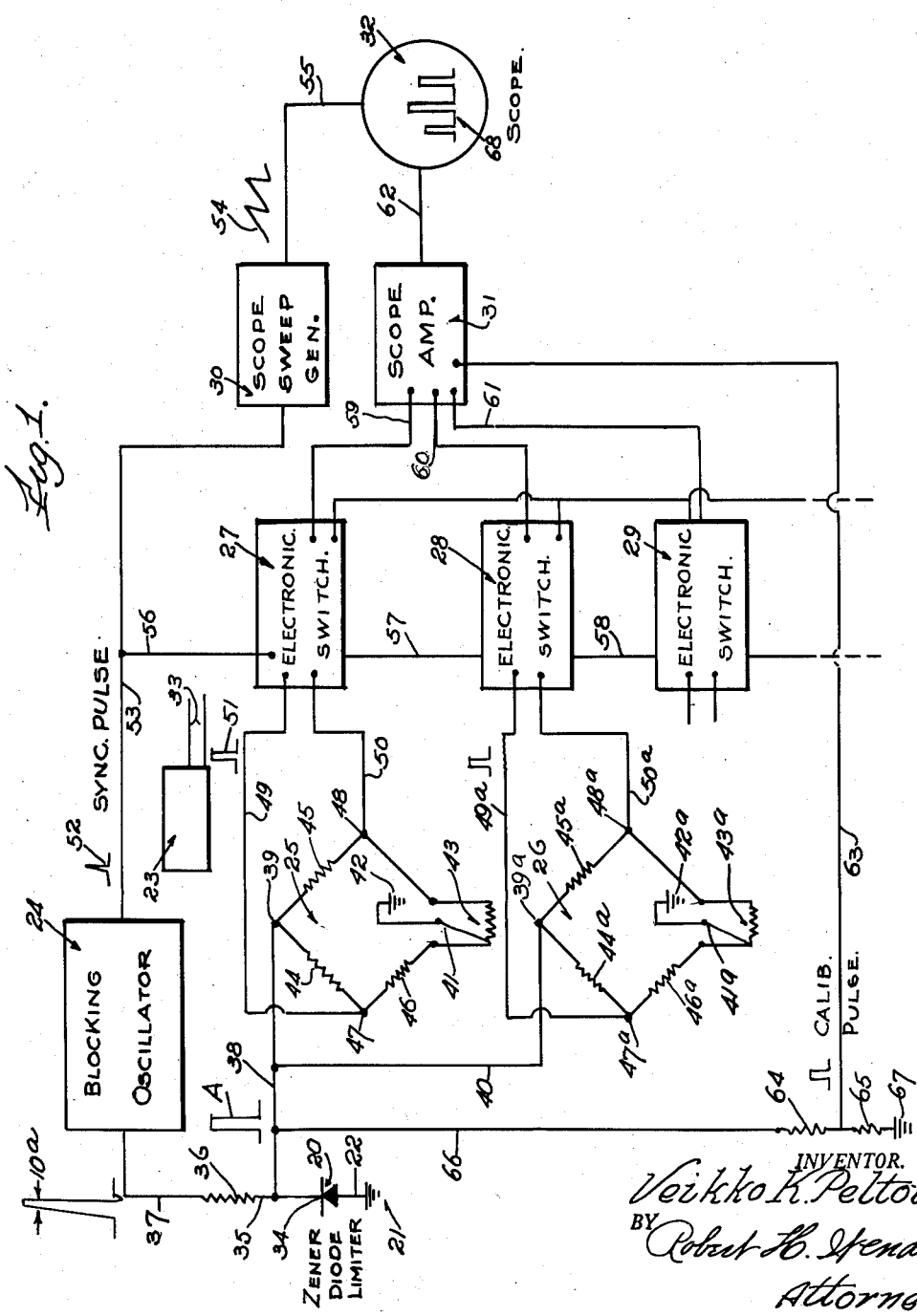
FIG. 1 is a simplified wiring diagram showing a pulsed resistance thermometer with a plurality of resistance bridges in which the output of all circuits may be shown on the oscilloscope at the same time.

Referring to FIG. 1, this is a schematic diagram for a pulsed resistance thermometer in which the temperature at all of the temperature zones is shown on the oscilloscope at the same time.

Any number of resistance thermometers and bridges may be employed, each of which has its corresponding electronic switch; and three electronic switches are shown for example. In this circuit 20 indicates a Zener diode limiter, the crystal of which is connected to ground 21 by conductor 22.

A suitable power pack 23 is included for energizing the blocking oscillator 24, the respective bridge circuits 25, 26, the electronic switches 27, 28, 29, the oscilloscope sweep generator 30, and the oscilloscope amplifier 31, which are connected to the oscilloscope tube 32.

This power pack 23 is energized from the A.C. line 110 volt, 60 cycle, which is indicated at 33, and is connected by suitable conductors to the components of the circuit 24—31 for supplying electric energization at suitable voltages and frequencies.

The Zener diode electrode 34 is connected by conductor 35 to the regulator resistance 36, which is connected by conductor 37 to the blocking oscillator 24.

Another conductor 38 connects the Zener diode to the junction 39 of bridge circuit 25; and a parallel conductor 40 extends to the similar juncture 39a of each of the additional bridge circuits employed.

A indicates diagrammatically the wave form of the constant voltage which is applied by the Zener diode to one juncture 39, 39a of the bridge circuits, the return circuit being from the opposing junction 41, 41a, which is connected in each case to ground at 42, 42a.

The temperature sensitive resistance in each bridge circuit is indicated at 43, 43a; and the other resistances of the bridge circuits are indicated at 44, 44a, 45, 45a, and 46, 46a, while the other two junctions of the bridge circuit are indicated at 47, 47a and 48, 48a.

The output from the bridge circuits 25, 26 is taken from the junctions 47, 48 by conductors 49, 50, 49a, 50a, which are connected to the electronic switches 27, 28, 29, as indicated.

The wave form of the output voltage is indicated at 51, this being substantially reduced in comparison with the constant voltage output of the Zener diode. The blocking oscillator supplies a synchroniszing pulse, the amplitude of which is indicated at 52; and this oscillator is connected by conductor 53 to the oscilloscope sweep generator 30, which may provide a sawtooth sweep wave, indicated at 54, through conductor 55, connected to the oscilloscope. The synchronizing pulse conductor 53 is connected by conductors 56, 57, and 58 to the electronic switches 27, 28, 29.

The output circuit of the electronic switches 27, 28, 29 is connected by conductors 59, 60, 61 to the oscilloscope amplifier, which in turn is connected by conductor to the oscilloscope 32. The circuit is provided with connections for impressing a calibrating pulse on the oscilloscope amplifier 31 by means of conductor 63, which extends from the oscilloscope amplifier to the voltage divider, indicated at resistances 64 and 65. These are connected by conductor 66 to the Zener diode output conductor 38 and to ground at 67.

The operation of the pulse resistance thermometer with multiple circuits as described is as follows. The Zener diode impresses a suitable high constant voltage upon each of the bridge circuits 25, 26, etc. in the form of a pulse, which energizes each of the bridge circuits momentarily; and the voltage output from each bridge is correspondingly increased, but the self-heating effect is diminished.

The voltage output of each bridge passes through an electronic switch circuit, these being synchronized by the synchronizing pulse 52 and amplified by the oscilloscope amplifier 31 and controlled by the oscillator sweep generator so that the temperatures of each of the zones being measured are indicated simultaneously on the oscilloscope 32, as shown at 68.

The calibrating pulse from the same source, the Zener diode 34, provides the reference voltage for the oscilloscope amplifier.

As an example of the change in amplitude of the pulse from a bridge circuit, one may consider a 50 ohm bridge, which is close in its characteristics to a 42 ohm thermometer resistance bulb.

The output from such a bridge would be approximately 2.5 millivolts per volt input to the bridge per percent unbalance of the bridge working into a high impedance detector. If one were to allow 5 milliamperes through the sensing element, this would mean that the bridge voltage V would be 0.5 volt.

The power dissipated in the 50 ohm sensing element would be in one second as follows:

$$I^2Rt=(.005)^2\times 50\times 1=.00125 \text{ watt per second}$$

If the time were reduced to $10^{-4}$ seconds and the same wattage were retained, the current may be calculated as follows:

$$I^2Rt=I^2\times 50\times 10^{-4}=.00125$$

$$I^2=\frac{.00125}{50\times 10^{-4}}=\frac{125}{50}=2.5$$

$$I=1.58 \text{ amperes}$$

For this current the bridge voltage would need to be $V=1.58\times 100=158$ volts.

It would follow that the output voltage V from the bridge would be as follows:

$$V_0=.0025\times 158=.395 \text{ volt per percent}$$

unbalance

Since the 42 ohm bulb changes approximately 13% in resistance from 50 degrees F. to 100 degrees F., the bridge output would be as follows:

$$V_0=.395\times 13=5.1 \text{ volts}$$

This shows that by applying pulse energization to the bridge circuit the applied voltage and the voltage output of the bridge may be increased sufficiently without excessive heating of the bulb so that very little amplification would be needed to secure maximum beam deflection on an oscilloscope.

Figure 2:
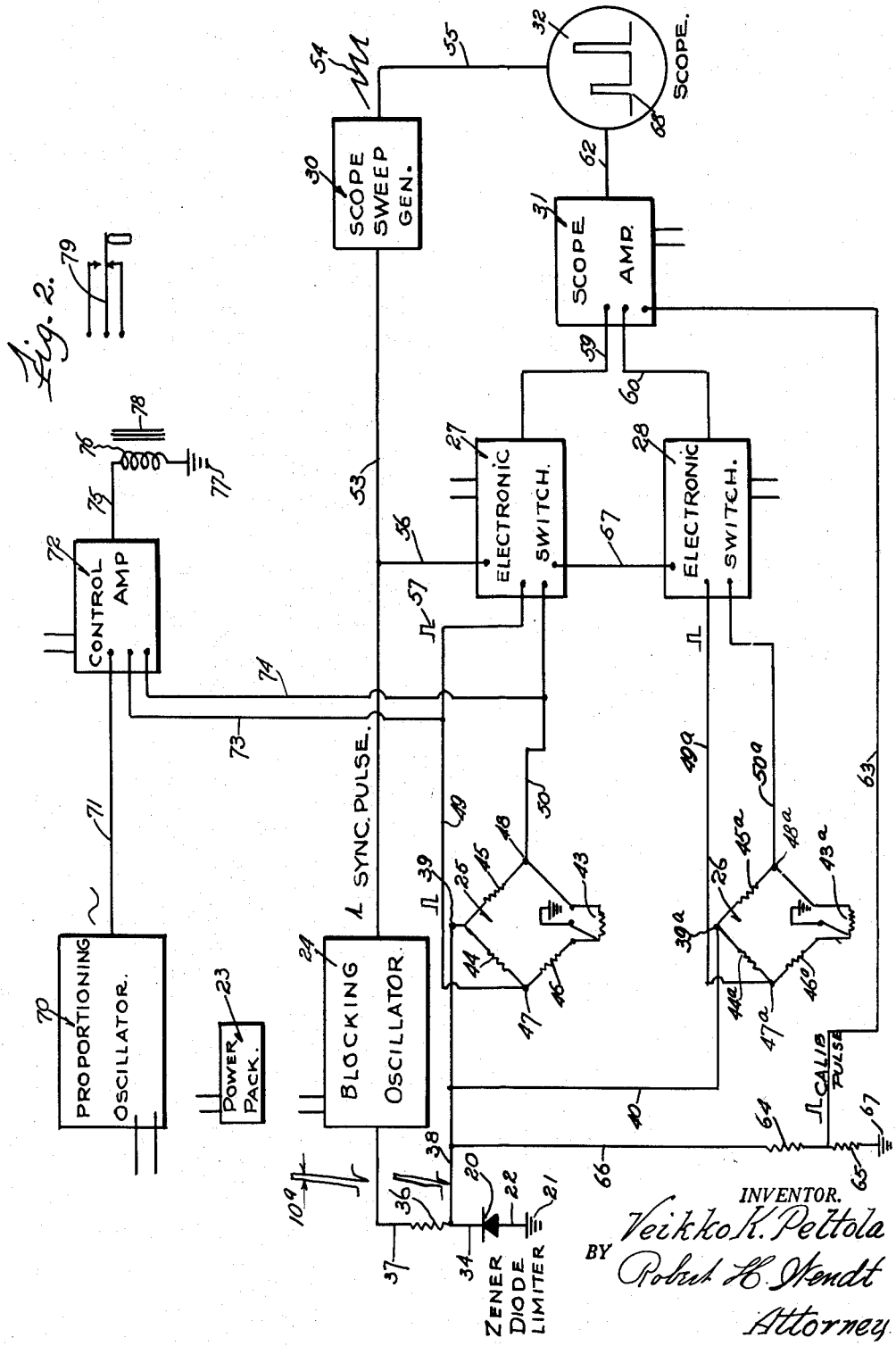
FIG. 2 is a simplified wiring diagram of a pulsed resistance thermometer controller.

Referring to FIG. 2, this diagram shows a modification in which a proportioning oscillator 70 has been added and suitably energized by the power pack 23. The proportioning oscillator 70 is connected by conductor 71 to a control amplifier 72 also energized from the power pack; and the control amplifiers are connected by conductors 73, 74 to the bridge output conductors 49, 50; and there are as many control amplifiers as there are bridges.

The output of the control amplifier is connected by conductor 75 to a relay coil 76, the other terminal of which is connected to ground at 77; and the armature 78 of the relay coil is adapted to open one circuit of the switch 79 and close the other circuit for the purpose of turning on or off heating circuits controlled by the resistance thermometers; and the characteristics of the circuit may be so selected that the heating devices controlled may anticipate the rise or drop of temperature and thus provide an anticipating control.

Figure 3:
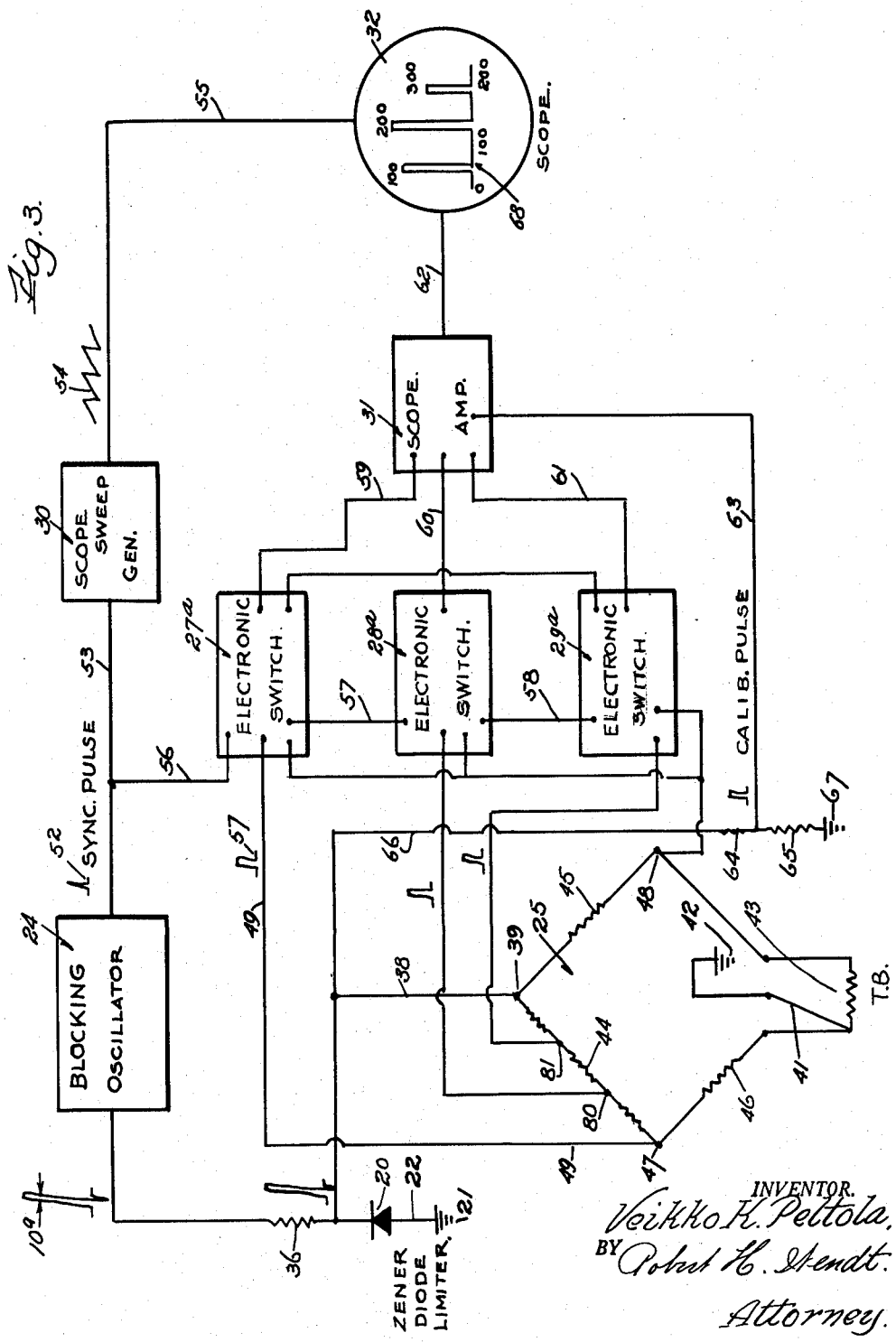
FIG. 3 is a simplified diagram of a single circuit pulsed resistance thermometer with switching arrangements to expand the scale for wider range of temperature readings.

Referring to FIG. 3, this is a diagram of a modification similar to FIG. 1, except that a single resistance bridge is provided with a plurality of different voltage taps on its bridge resistor 44, the taps being indicated at 80 and 81 and used in connection with the conductors 38 to provide bridge output circuits of different voltage separately impressed upon the electronic switches 27a, 28a, 29a.

The outputs of these electronic switches are again impressed upon the oscilloscope amplifier 31, which is connected with the oscilloscope circuit in the same manner as previously described for producing simultaneously three indications of the temperature on a scale of 0 to 100, 100 to 200, and 200 to 300.

This enables the scale to be expanded and a wider range of temperature indication accomplished with a single circuit and a long scale.

Figure 4:
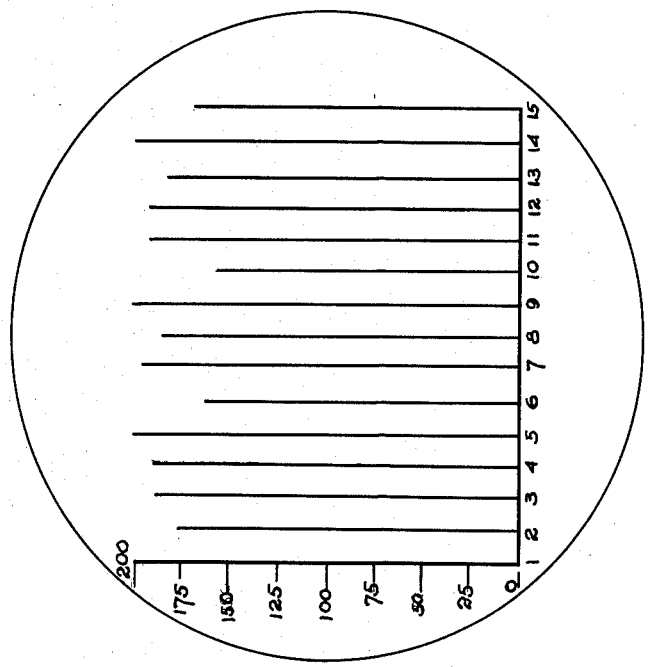
FIG. 4 is a diagrammatic end view of an oscilloscope screen showing a plurality of simultaneous temperature indications for different zones of temperature, such as the cylinders of a diesel engine, in which the temperatures may be compared for corrective adjustments.

Referring to FIG. 4, this is a diagrammatic illustration of the screen of an oscilloscope which is used for simultaneously indicating the temperature of fifteen different zones of temperature, such as the cylinders of a diesel engine, utilizing a similar number of resistance bridges and resistance bulbs. As previously described, any number of resistance bridges and bulbs may be employed with any number of electronic switches corresponding thereto.

Comparison of the vertical lines on FIG. 4 above the numbers of the cylinders indicates which of the cylinders is at proper temperature and which require corrective adjustments.

It will thus be observed that by using a pulse energization of a resistance bridge the self-heating effect may be considerably diminished or held within a reasonable limit, while applying a higher voltage to the bridge and securing a correspondingly higher voltage output.

The applied pulse voltage may be maintained substantially constant by using a Zener diode limiter in conjunction with a blocking oscillator type power supply; and a portion of the constant amplitude pulse may also be used as a calibration pulse.

A synchronizing pulse may be applied to the sweep generator and electronic switches for effecting the simultaneous indication of temperatures at different zones of temperature; and various other circuits may be controlled by the resistance bridge, such as an alarm circuit that would operate when the pulse applied to it reaches a predetermined amplitude. Another circuit could be of the on-off control type or a proportioning control type.

Referring to FIG. 5, this is a complete wiring diagram of the simplest type of pulsed resistance thermometer adapted to indicate the temperature of a single temperature zone. As only a single zone is illustrated, the electronic switch is not required in this circuit; but this circuit includes a blocking oscillator 80, the components of which are enclosed in a dash line rectangle and a cathode follower 81, the components of which are enclosed in a second dash line rectangle.

The blocking oscillator may be energized by a D.C. power supply, one terminal of which is connected by conductor 83 to an inductance, such as the primary 84 of a transformer, which is connected by conductor 85 to the plate 86 of vacuum tube 87.

The vacuum tube 87 has its cathode 88 grounded as shown; and its grid 90 is connected by conductor 91 through a condenser 92, such as a .005 microfarad to the grid of a second tube 94.

The conductor 95 from the grid 93 of tube 94 is connected by conductor 96 to one terminal of the secondary 97, the other terminal of which is grounded at 98. The grid 90 is grounded by conductor 99 through a resistor 100 at the ground 101.

Both tubes are provided with the usual filaments energized by alternating current (not shown). The blocking oscillator generates pulses of voltage, the wave form of which may be indicated by the number 102 on the diagram.

The D.C. power supply is connected to ground at 103 by conductor 104; and the plate 105 of tube 94 is connected by conductor 106 to conductor 83, which is connected to the D.C. power supply.

The cathode 107 of vacuum tube 94 is connected through resistor 108 to a primary 109 of a transformer, the other terminal of which is grounded at 110. The secondary 111 of the transformer is connected by conductor 112 to the input terminal 113 of the resistance bridge 114. The other terminal of transformer 111 is connected by conductor 115 through resistor 116 to conductor 117 leading to the other input terminal 118 of the bridge circuit.

The conductors 117 and 112 are connected to a Zener diode 119 by conductors 120 and 121; and the diode illustrated is of the type which includes two diodes back to back, one having a positive temperature coefficient and the other having a negative temperature coefficient, enabling the diode to work over a wide temperature range.

The wave form and amplitude of the pulse in the conductors 115 and 117 are indicated by the wave forms shown at 122 and 123.

The cathode 107 is connected by conductor 124 through a condenser 125 to conductor 126, which is used for impressing a synchronizing pulse of the wave form indicated at 127 on the cathode ray oscilloscope 128 at 129. This oscilloscope is of the type having its own amplifier; and the wave form is shown at 130 on the screen of the cathode ray tube 131.

The output terminals of the bridge 114 are indicated at 132 and 133; and the bridge resistances are indicated at 134, 135, 136, while the temperature sensitive resistor is indicated at 137. The output from the resistance bridge is connected by conductors 138 and 139 to the contacts 140 and 141 of a double pole, double throw electric switch 142.

The two movable switch arms 143 and 144 are connected by conductors 145 and 146 to the input terminals 147 and 148 of the oscilloscope.

The calibration resistors 149 and 150 are connected by conductors 151 and 152 to the conductors 117 and 112 leading to the bridge input terminals 118, 113. Conductor 153 extends from a point between the resistors 149, 150 to the fixed contact 154; and conductor 155 extends from the terminal of resistor 150 to the fixed contact 156. The wave form and amplitude in conductor is indicated at 157; and the wave form in conductor 138 is indicated at 158.

The operation of the calibration switch 142 is as follows: The switch is moved into connection with contacts 156 and 154; and the gain is adjusted so that the height of the wave form 130 on the oscilloscope is suitable for the temperature measurements desired; and then the switch 142 is thrown over into connection with the terminals 140 and 141 for impressing the bridge output on the oscilloscope.

The operation of the present pulsed resistance thermometer is substantially the same as that described for the other modifications.

The blocking oscillator produces the pulses of voltage; and the Zener diode maintains the constant voltage desired, which is impressed upon the resistance bridge.

The cathode follower is a coupling circuit, forming an impedance matching device for coupling the blocking oscillator to the resistance bridge input.

The oscilloscope 128 includes its own sweep circuit; and by means of the application of pulses of voltage, a higher voltage may be applied to the temperature sensitive resistor without causing excessive self-heating.

The pulse type system would lend itself readily to unit construction so that one could have an indicator unit, an alarm unit, and on-off control unit, or a proportioning control unit, all readily attachable and detachable and operating from the same thermobulb circuit.

The duration and amplitude of the pulses applied to the resistance bridges may be selected to produce substantially the same wattage dissipation in the thermobulb as would be obtained by a normal D.C. or A.C. bridge current.

High voltage may thus be applied to the bridge circuits without excessive self-heating of the resistance bulb, since the high voltage is applied in short pulses, heating the bulb only momentarily for short periods of time.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A high accuracy temperature measuring and indicating system comprising three constant resistances and a temperature sensitive resistance, all connected end to end in series to form a resistance bridge having two input terminals and two output terminals, a source of energization connected to the input of a blocking oscillator for generating an electric impulse having a peak wave of predetermined amplitude, a cathode follower circuit including a transformer energized from the same source and having its grid controlled by connection to said oscillator, said transformer having a secondary acting as an output circuit, a pair of Zener diodes connected back to back, one of said diodes having a positive temperature coefficient and the other diode having a negative temperature coefficient for maintaining constant characteristics over a wide temperature range, said pair of diodes being bridged across the output circuit of said secondary, circuits for impressing the output from said secondary upon the input terminals of said bridge, said electric impulse being reduced to a flat top wave of calibrated amplitude, a cathode ray oscilloscope provided with oscilloscope circuits and means for connecting the output terminals of said bridge circuit to the input of said cathode ray oscilloscope circuits for indicating upon the oscilloscope the temperature to which the temperature sensitive resistance of the bridge is subjected.

2. A high accuracy temperature measuring and indicating system according to claim 1, in which the cathode of the cathode ray follower is connected to the oscilloscope circuits to provide a synchronizing pulse and the transformer has its secondary provided with an adjustable resistance across the secondary, having leads and a two-way switch interposed in the input circuit to the bridge for impressing a calibration pulse on the oscilloscope circuits and adjusting the height of the wave form on the oscilloscope for the temperature measurements desired.

References Cited in the file of this patent

UNITED STATES PATENTS

| | | |
|---|---|---|
| 2,437,449 | Ames | Mar. 9, 1948 |
| 2,467,856 | Rich | Apr. 19, 1949 |
| 2,488,580 | Burleigh | Nov. 22, 1949 |
| 2,531,145 | Marco | Nov. 21, 1950 |
| 2,611,811 | Yates | Sept. 23, 1952 |
| 2,805,311 | Fluegel | Sept. 3, 1957 |
| 2,833,980 | Hedgcock | May 6, 1958 |

FOREIGN PATENTS

| | | |
|---|---|---|
| 569,279 | Great Britain | May 16, 1945 |